(12) United States Patent
Tamura

(10) Patent No.: US 10,326,898 B2
(45) Date of Patent: Jun. 18, 2019

(54) TERM MANAGEMENT SYSTEM, IMAGE FORMING APPARATUS, AND TERM MANAGEMENT METHOD

(71) Applicant: KYOCERA Document Solutions Inc., Osaka-shi, Osaka (JP)

(72) Inventor: Takashi Tamura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/659,465

(22) Filed: Jul. 25, 2017

(65) Prior Publication Data

US 2018/0032289 A1 Feb. 1, 2018

(30) Foreign Application Priority Data

Jul. 28, 2016 (JP) .................................. 2016-148573

(51) Int. Cl.
*H04N 1/00* (2006.01)
*G06F 3/12* (2006.01)
*G06F 9/451* (2018.01)

(52) U.S. Cl.
CPC ....... *H04N 1/00503* (2013.01); *G06F 3/1204* (2013.01); *G06F 3/1253* (2013.01); *G06F 3/1258* (2013.01); *G06F 3/1288* (2013.01); *G06F 9/454* (2018.02); *H04N 1/00506* (2013.01)

(58) Field of Classification Search
CPC combination set(s) only.
See application file for complete search history.

(56) References Cited

U.S. PATENT DOCUMENTS

| 5,652,884 A | * | 7/1997 | Palevich | ................. | G06F 9/454 |
| | | | | | 713/1 |
| 9,280,319 B2 | * | 3/2016 | Badawy | .................... | G06F 8/20 |
| 9,304,785 B2 | * | 4/2016 | Canu | ...................... | G06Q 10/10 |
| 2004/0218209 A1 | * | 11/2004 | Hamaguchi | ............. | H04L 67/04 |
| | | | | | 358/1.15 |
| 2008/0016450 A1 | * | 1/2008 | Aono | ................. | H04N 1/00413 |
| | | | | | 715/747 |
| 2008/0077861 A1 | | 3/2008 | Yamamoto | | |
| 2013/0166509 A1 | * | 6/2013 | Clark | ........................ | G06F 8/71 |
| | | | | | 707/638 |
| 2013/0215458 A1 | * | 8/2013 | Machida | ............ | H04N 1/00954 |
| | | | | | 358/1.15 |

(Continued)

FOREIGN PATENT DOCUMENTS

| JP | 2006015623 A | 1/2006 |
| JP | 2008079162 A | 4/2008 |
| JP | 2014179951 A | 9/2014 |

*Primary Examiner* — Barbara D Reinier
(74) *Attorney, Agent, or Firm* — Alleman Hall Creasman & Tuttle LLP

(57) ABSTRACT

A term management system includes a term management portion and a plurality of image forming apparatuses. The term management portion stores term management information in which terms are defined in association with corresponding term IDs. The plurality of image forming apparatuses each include an acquiring processing portion. The acquiring processing portion is configured to acquire one or more terms from the term management information so that the one or more terms are displayed on a display portion based on corresponding one or more term IDs.

11 Claims, 6 Drawing Sheets

| TERM ID | TERM 0001 | TERM 0002 | ... | ... |
|---|---|---|---|---|
| MODEL A1 | TERM VERSION 1 | TERM VERSION 1 | ... | ... |
| MODEL B1 | TERM VERSION 2 | TERM VERSION 1 | ... | ... |
| MODEL A2 | TERM VERSION 2 | TERM VERSION 2 | ... | ... |

(56) References Cited

U.S. PATENT DOCUMENTS

| | | | | |
|---|---|---|---|---|
| 2013/0290075 A1* | 10/2013 | Kathooria | ........ | G06Q 10/06395 705/7.41 |
| 2014/0244236 A1* | 8/2014 | Johnson, III | .......... | G06F 17/289 704/2 |
| 2015/0324336 A1* | 11/2015 | Glezos | ................ | G06F 17/2247 715/234 |
| 2015/0324667 A1* | 11/2015 | Harada | ................ | G06F 3/1205 358/1.15 |

* cited by examiner

FIG. 5

| TERM ID | TERM 0001 | TERM 0002 | ... | ... |
|---|---|---|---|---|
| TERM | COLLECTIVE PRINTING | ENLARGEMENT CONSECUTIVE PRINTING | ... | ... |

| BASIC SETTING | LAYOUT |
|---|---|
| COLLECTIVE PRINTING | ENLARGEMENT CONSECUTIVE PRINTING |
| 1  2 | 1  2 <br> 3  4 |
| HELP | OK |

| TERM ID | TERM 0001 | TERM 0002 | ... | ... |
|---|---|---|---|---|
| TERM | PAGE COLLECTIVE PRINTING | ENLARGEMENT CONSECUTIVE PRINTING | ... | ... |

| TERM ID | TERM 0001 | TERM 0002 | ... | ... |
|---|---|---|---|---|
| TERM | PAGE COLLECTIVE PRINTING | POSTER | ... | ... |

| TERM ID | TERM 0001 | TERM 0002 | ... | ... |
|---|---|---|---|---|
| TERM VERSION 1 | COLLECTIVE PRINTING | ENLARGEMENT CONSECUTIVE PRINTING | ... | ... |
| TERM VERSION 2 | PAGE COLLECTIVE PRINTING | POSTER | ... | ... |
| TERM VERSION 3 | — | — | ... | ... |
| ... | ... | ... | ... | ... |

| TERM ID | TERM 0001 | TERM 0002 | ... | ... |
|---|---|---|---|---|
| MODEL A1 | TERM VERSION 1 | TERM VERSION 1 | ... | ... |
| MODEL B1 | TERM VERSION 2 | TERM VERSION 1 | ... | ... |
| MODEL A2 | TERM VERSION 2 | TERM VERSION 2 | ... | ... |

TERM CHANGE

SELECT TERM SET TO USE

| TERM SET OF MODEL A1 | — B1 |
| TERM SET OF MODEL B1 | — B2 |
| TERM SET OF MODEL A2 | — B3 |
| TERM SET OF LATEST TERMS | — B4 |

| TERM ID | TERM 0001 | TERM 0002 | ... | ... |
|---|---|---|---|---|
| MODEL A1 | TERM VERSION 1 | TERM VERSION 1 | ... | ... |
| MODEL B1 | TERM VERSION 2 | TERM VERSION 1 | ... | ... |
| MODEL A2 | TERM VERSION 2 | TERM VERSION 2 | ... | ... |
| CLIENT A | TERM VERSION 1 | TERM VERSION 2 | ... | ... |

TERM MANAGEMENT SYSTEM, IMAGE FORMING APPARATUS, AND TERM MANAGEMENT METHOD

INCORPORATION BY REFERENCE

This application is based upon and claims the benefit of priority from the corresponding Japanese Patent Application No. 2016-148573 filed on Jul. 28, 2016, the entire contents of which are incorporated herein by reference.

BACKGROUND

The present disclosure relates to a term management system for managing terms displayed on a display portion of an image forming apparatus, an image forming apparatus, and a term management method.

In two image forming apparatuses that differ, for example, in model or release date, a same function may be represented by different terms on a display portion of an operation panel. More specifically, a function to print an enlarged image on a plurality of paper sheets may be called "enlargement consecutive printing" in one image forming apparatus, and "poster" in the other. Such a disunity of terms induces confusion in the user, thus the terms should be unified as much as possible.

However, to modify the terms displayed on the display portion, it is, in general, necessary to modify the firmware of the image forming apparatus. As a result, after the shipment of the image forming apparatus, it is not easy to modify the terms displayed on the display portion.

SUMMARY

A term management system according to an aspect of the present disclosure includes a term management portion and a plurality of image forming apparatuses. The term management portion stores term management information in which terms are defined in association with corresponding term IDs. The plurality of image forming apparatuses each include an acquiring processing portion. The acquiring processing portion is configured to acquire one or more terms from the term management information so that the one or more terms are displayed on a display portion based on corresponding one or more term IDs.

An image forming apparatus according to another aspect of the present disclosure includes a communication portion and an acquiring processing portion. The communication portion communicates with a term management portion storing term management information in which terms are defined in association with corresponding term IDs. The acquiring processing portion is configured to acquire one or more terms from the term management information via the communication portion so that the one or more terms are displayed on a display portion based on corresponding one or more term IDs.

A term management method according to a further aspect of the present disclosure includes a communication step and an acquiring processing step. The communication step communicates with a term management portion storing term management information in which terms are defined in association with corresponding term IDs. The acquiring processing step acquires one or more terms from the term management information so that the one or more terms are displayed on a display portion based on corresponding one or more term IDs.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of a term reference table used in the image forming apparatus according to the embodiment of the present disclosure.

FIG. 6 is a diagram showing a display example of the print setting screen used in the image forming apparatus according to the embodiment of the present disclosure.

FIG. 7 is a diagram showing an example of the term reference table used in the image forming apparatus according to the embodiment of the present disclosure.

FIG. 8 is a diagram showing an example of the term reference table used in the image forming apparatus according to the embodiment of the present disclosure.

FIG. 9 is a diagram showing an example of a term management table used in a term management system according to the embodiment of the present disclosure.

FIG. 10 is a diagram showing an example of a term set information management table used in the term management system according to the embodiment of the present disclosure.

FIG. 11 is a diagram showing an example of a term change screen used in the image forming apparatus according to the embodiment of the present disclosure.

FIG. 13 is a diagram showing a variation of the term set information management table used in the term management system according to the embodiment of the present disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
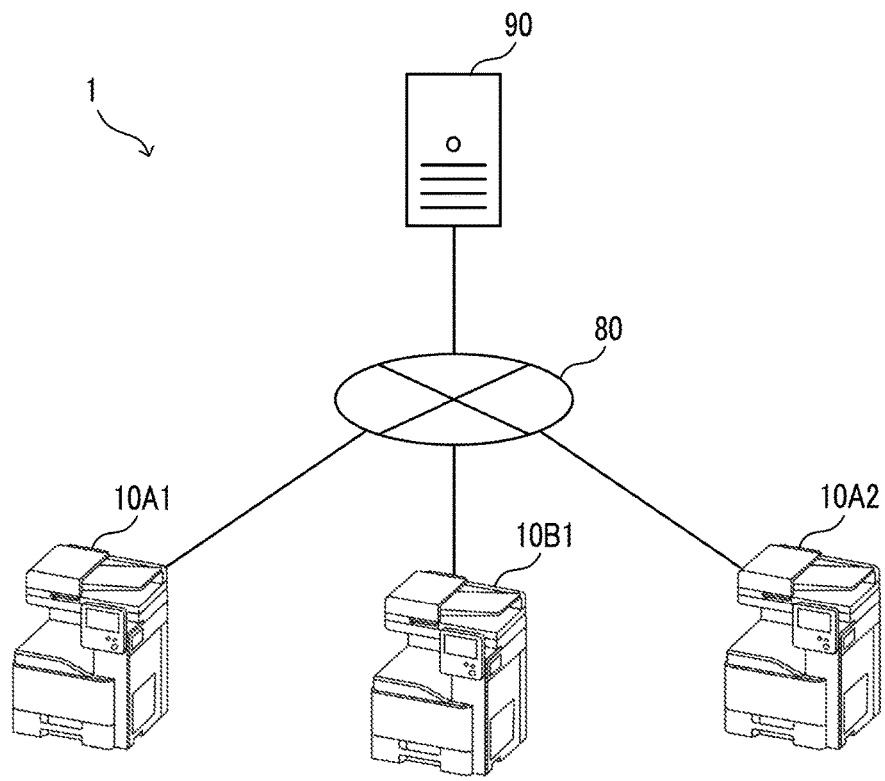
FIG. 1 is a diagram showing an entire configuration of a term management system according to an embodiment of the present disclosure.

As shown in FIG. 1, a term management system 1 according to an embodiment of the present disclosure includes a plurality of image forming apparatuses 10 (10A1, 10B1, and 10A2) and a term management server 90. The image forming apparatus 10 is a multifunction peripheral having a plurality of functions such as a printer function, a scanner function, a copy function, and a facsimile function. It is noted that the present disclosure is not limited to a multifunction peripheral, but is applicable to image forming apparatuses such as a copier, a printer, and a facsimile apparatus. The term management server 90 is an example of the term management portion of the present disclosure.

Here, as one example, a case where three image forming apparatuses 10A1, 10B1, and 10A2 are included in the term management system 1 is described. The image forming apparatus 10A1 is the first mass production version of a model A, the image forming apparatus 10B1 is the first mass production version of the model B, and the image forming apparatus 10A2 is a design change version of the model A.

Each image forming apparatus 10 is configured to connect to the term management server 90 via a communication line 80 such as the Internet. The term management server 90 stores a term management table 41 (see FIG. 9) that associates terms with term IDs. The term management table 41 is an example of the term management information of the present disclosure. In the term management server 90, a term set information management table 42 (see FIG. 10) is also stored, wherein a plurality of pieces of term set information 50 are registered in the term set information management table 42. Details of the term management table 41 and the term set information management table 42 are described below.

Figure 2:
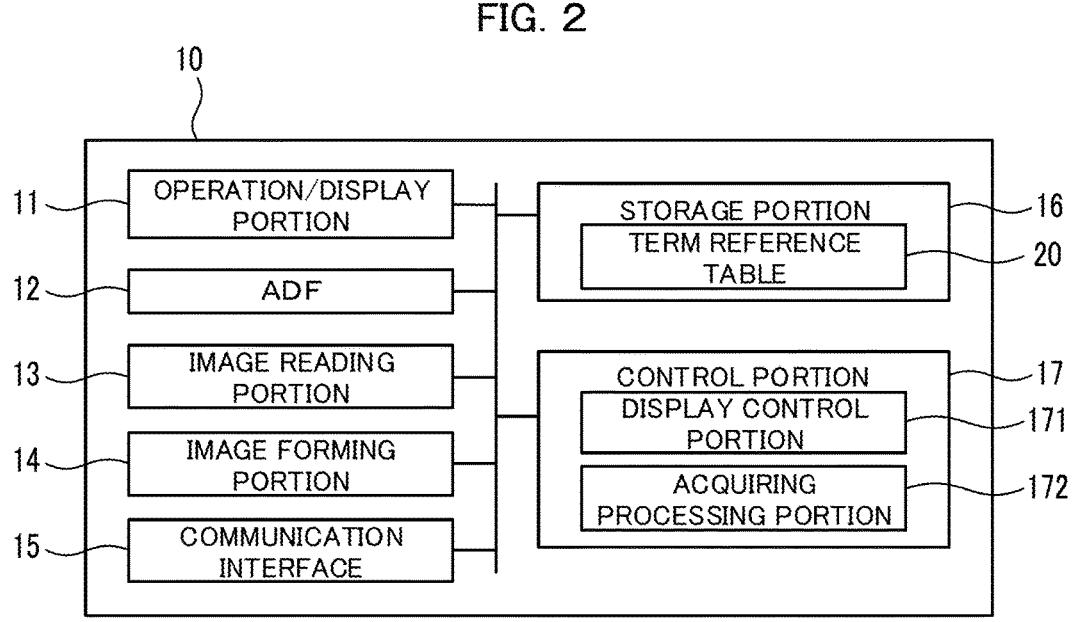
FIG. 2 is a block diagram showing a system configuration of an image forming apparatus according to the embodiment of the present disclosure.

Next, a configuration of the image forming apparatus 10 is described with reference to FIG. 2. The image forming apparatus 10 includes an operation/display portion 11, an ADF 12, an image reading portion 13, an image forming portion 14, a communication interface 15, a control portion 17, and a storage portion 16.

The operation/display portion 11 includes a display portion and an operation portion, wherein the display portion is, for example, a liquid crystal display and displays information, and the operation portion includes a touch panel and operation buttons for receiving user operations. The touch panel is provided on a display surface of the display portion.

The ADF 12 is an automatic document feeding device including a document sheet setting portion, conveyance rollers, a document sheet pressing, and a sheet discharge portion, and conveys a document sheet so that it is read by the image reading portion 13.

The image reading portion 13 includes a document sheet table, a light source, a mirror, an optical lens, and a CCD (Charge Coupled Device), and is configured to read an image from a document sheet and output the image as image data.

The image forming portion 14 is configured to execute a printing process by the electrophotography or the inkjet method to form an image on a sheet based on image data. As one example, when the image forming portion 14 is an electrophotographic image forming portion, the image forming portion 14 includes a photoconductor drum, a charger, an exposure device, a developing device, a transfer device, and a fixing device. The image forming portion 14 forms an image on a sheet based on a user operation performed on the operation/display portion 11.

The communication interface 15 is configured to execute a communication process to communicate with an external information processing apparatus such as a facsimile apparatus or a personal computer via a communication network such as a telephone line, the Internet, or a LAN, in accordance with a predetermined communication protocol. The communication interface 15 is an example of the communication portion of the present disclosure.

The storage portion 16 is a nonvolatile storage portion such as a hard disk or an EEPROM™. The storage portion 16 stores various control programs to be executed by the control portion 17, and a term reference table 20 (see FIG. 5) that is described below The control portion 17 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 17 includes a display control portion 171 and an acquiring processing portion 172. It is noted that the control portion 17 functions as these processing portions when it executes various processes in accordance with the control programs. In addition, the control portion 17 may include an electronic circuit that implements part or all of processing functions of the processing portions.

The display control portion 171 displays, on the operation/display portion 11, various types of screens such as a print setting screen 31 (see FIG. 6) and a help screen 32 that are described below. The display control portion 171 displays the various screens based on control programs (for example, firmware) stored in the ROM.

Figure 3:
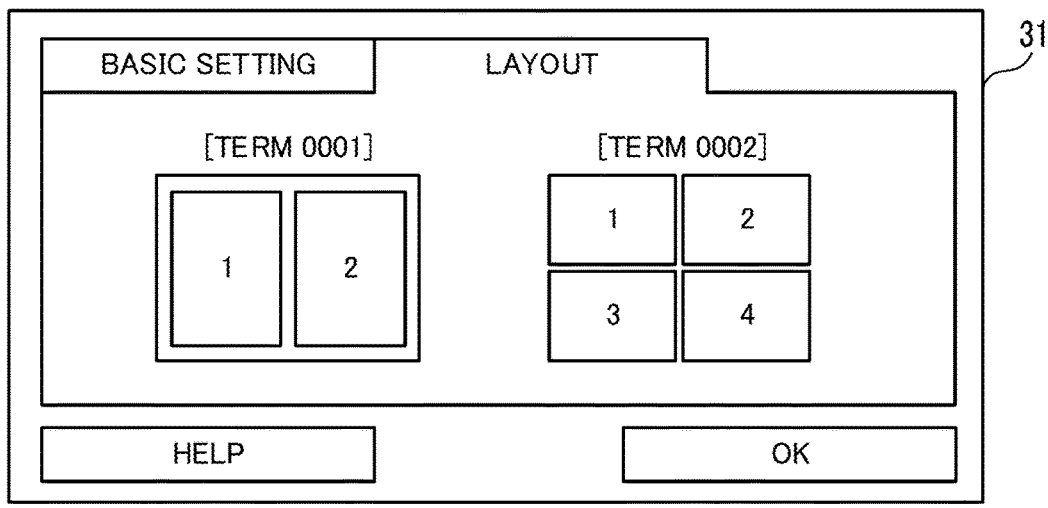
FIG. 3 is a diagram showing an example of screen configuration information of a print setting screen used in the image forming apparatus according to the embodiment of the present disclosure.
Figure 4:
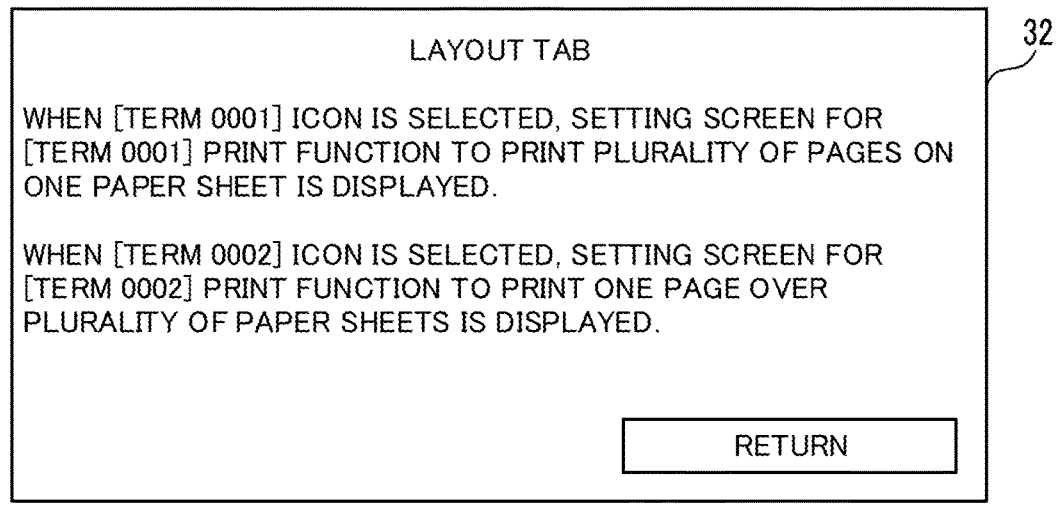
FIG. 4 is a diagram showing an example of screen configuration information of a help screen used in the image forming apparatus according to the embodiment of the present disclosure.

The various screens displayed on the operation/display portion 11 by the display control portion 171 are generated based on screen configuration information that is defined in advance. The screen configuration information is defined by using term IDs. For example, as shown in FIG. 3, two term IDs [term 0001] and [term 0002] are used to define the screen configuration information of the print setting screen 31. In addition, as shown in FIG. 4, the two term IDs [term 0001] and [term 0002] are also used to define the screen configuration information of the help screen 32 that is displayed on the operation/display portion 11 when the help button is selected on the print setting screen 31.

On the other hand, terms corresponding to the term IDs are defined in the term reference table 20 stored in the storage portion 16. The display control portion 171 refers to the term reference table 20, replaces the term IDs used in the screen configurations shown in FIG. 3 and FIG. 4 with corresponding terms, and displays, on the operation/display portion 11, the screens in the state where the term IDs have been replaced with the corresponding terms.

Meanwhile, in two image forming apparatuses that differ in model or release date, a same function may be represented by different terms on a display portion of an operation panel. More specifically, a function to print an enlarged image on a plurality of paper sheets may be called "enlargement consecutive printing" in one image forming apparatus, and "poster" in the other. Such a disunity of terms induces confusion in the user, thus the terms should be unified as much as possible. However, to modify the terms displayed on the display portion, it is, in general, necessary to modify the firmware of the image forming apparatus. As a result, after the shipment of the image forming apparatus, it is not easy to modify the terms displayed on the display portion.

It is noted that there is known an image forming apparatus in which terms or sentences that are written in a plurality of languages are stored in advance, and the language displayed on the operation panel of the image forming apparatus can be changed in response to a user operation. However, with a configuration where a plurality of terms corresponding to a same term ID are stored in each of a plurality of image forming apparatuses in advance, it is not easy to change a term that is used in the plurality of image forming apparatuses.

On the other hand, in the term management system 1 according to the present embodiment, a term that can be used in each image forming apparatus 10 can be acquired from the term management server 90. This makes it possible to easily change terms used in the plurality of image forming apparatuses 10.

FIG. 5 shows a term reference table 20A1 that is stored in the storage portion 16 of the image forming apparatus 10A1 (namely, the first mass production version of the model A) at the time of the shipment. In the term reference table 20A1, a term "collective printing" is defined in association with a term ID "term 0001", and a term "enlargement consecutive printing" is defined in association with a term ID "term 0002". Accordingly, [term 0001] and [term 0002] included in the screen configuration information shown in FIG. 3 are respectively replaced with "collective printing" and "enlargement consecutive printing", and the print setting screen 31 shown in FIG. 6 is displayed on the operation/display portion 11 of the image forming apparatus 10A1.

FIG. 7 shows a term reference table 20B1 that is stored in the storage portion 16 of the image forming apparatus 10B1 (namely, the first mass production version of the model B) at the time of the shipment. In the term reference table 20B1, a term "page collective printing" is associated with a term ID "term 0001", and a term "enlargement consecutive printing" is associated with a term ID "term 0002". That is, in the image forming apparatus 10B1, "page collective printing" is displayed at a place where "collective printing" is displayed in the image forming apparatus 10A1.

FIG. 8 shows a term reference table 20A2 that is stored in the storage portion 16 of the image forming apparatus 10A2 (namely, the design change version of the model A) at the time of the shipment. In the term reference table 20A2, a term "page collective printing" is associated with a term ID "term 0001", and a term "poster" is associated with a term ID "term 0002". That is, in the image forming apparatus 10A2, "page collective printing" is displayed at a place where "collective printing" is displayed in the image forming apparatus 10A1, and "poster" is displayed at a place where "enlargement consecutive printing" is displayed in the image forming apparatus 10A1.

Such a disunity of terms may be caused by various factors. A disunity of terms between different models may be caused if the models are developed by different development teams, and the development teams do not use a unified set of terms. In addition, even in a same model, a design change version may be released several years after a first mass production version is released. In that case, the terms may be revised, and terms that have become old-fashioned and not used often may be replaced with new terms.

However, such a disunity of terms induces confusion in the user. For example, for a user who is accustomed to the term "enlargement consecutive printing" may feel difficult to understand the term "poster" used in the image forming apparatus 10A2 that has been bought newly. In addition, for example, in a company that uses all of the three types of image forming apparatus 10, when an operation manual of the image forming apparatus 10 is created, if different terms are used among the three types of image forming apparatuses 10, it is necessary to describe correspondence relationship in the operation manual, which takes time and effort.

In view of the above-described problem, the term management system 1 according to the present embodiment is provided with the term management server 90 such that a term displayed on the image forming apparatus 10 can be easily changed.

The term management server 90 stores the term management table 41 shown in FIG. 9 and the term set information management table 42 shown in FIG. 10.

As shown in FIG. 9, the term management table 41 shows correspondence between term IDs and terms of different term versions. More specifically, in the term management table 41, each term ID is associated with a plurality of terms that respectively belong to different term versions and have the same meaning. The term versions are identified by term version IDs such as "term version 1" and "term version 2" shown in FIG. 9. For example, in the example shown in FIG. 9, two terms "collective printing" and "page collective printing" are associated with a term ID "term 0001" assigned to a term that means printing a plurality of pages on one paper sheet. In addition, two terms "enlargement consecutive printing" and "poster" are associated with a term ID "term 0002" assigned to a term that means printing one page over a plurality of paper sheets. In this way, the term management table 41 associates a plurality of terms with a plurality (for example, hundreds to thousands) of term IDs. It is noted that an arbitrary number of terms may be associated with each term ID. For example, four terms may be associated with a certain term ID, two terms may be associated with another term ID, and only one term may be associated with a further term ID.

As shown in FIG. 10, a plurality of pieces of term set information 50 are registered in the term set information management table 42, wherein each piece of term set information 50 indicates, for each term ID, one of the plurality of terms having the same meaning. The plurality of pieces of term set information 50 may include some pieces of term set information 50 that correspond to the models of the image forming apparatus 10, such as a piece of term set information 50 corresponding to the model A, a piece of term set information 50 corresponding to the model B, and a piece of term set information 50 corresponding to the model C. Alternatively, as shown in FIG. 10, the plurality of pieces of term set information 50 may include a plurality of pieces of term set information 50 that correspond to different versions of each model of the image forming apparatus 10. For example, the term set information management table 42 shown in FIG. 10 includes a piece of term set information 50 corresponding to the first mass production version of the model A (hereinafter referred to as "model A1"), a piece of term set information 50 corresponding to the first mass production version of the model B (hereinafter referred to as "model B1"), and a piece of term set information 50 corresponding to the design change version of the model A (hereinafter referred to as "model A2").

In FIG. 10, in a piece of term set information 50 corresponding to the model A1, terms defined in the term reference table 20 (for example, the term reference table 20A1 shown in FIG. 5) stored in the model A1 at the time of the shipment, are defined in association with corresponding term IDs. Specifically, in the piece of term set information 50, a term of the term version 1 (namely, term "collective printing" indicated in the term management table 41 shown in FIG. 9 in association with the term version 1), is defined in association with "term 0001". In addition, in the piece of term set information 50, a term of the term version 1 (namely, term "enlargement consecutive printing" indicated in the term management table 41 shown in FIG. 9 in association with the term version 1), is defined in association with "term 0002".

Similarly, in a piece of term set information 50 corresponding to the model B1, terms defined in the term reference table 20 (for example, the term reference table 20B1 shown in FIG. 7) that is stored in the model B1 at the time of the shipment, are defined in association with corresponding term IDs. Specifically, in the piece of term set information 50, a term of the term version 2 (namely, term "page collective printing" indicated in the term management table 41 shown in FIG. 9 in association with the term version 2), is defined in association with "term 0001". In addition, in the piece of term set information 50, a term of the term version 2 (namely, term "enlargement consecutive printing" indicated in the term management table 41 shown in FIG. 9 in association with the term version 1), is defined in association with "term 0002".

Similarly, in a piece of term set information 50 corresponding to the model A2, terms defined in the term reference table 20 (for example, the term reference table 20A2 shown in FIG. 8) that is stored in the model A2 at the time of the shipment, are defined in association with corresponding term IDs. Specifically, in the piece of term set information 50, a term of the term version 2 (namely, term "page collective printing" indicated in the term management table 41 shown in FIG. 9 in association with the term version 2), is defined in association with "term 0001". In addition, in the piece of term set information 50, a term of the term version 2 (namely, term "poster" indicated in the term management table 41 shown in FIG. 9 in association with the term version 2), is defined in association with "term 0002".

The acquiring processing portion 172 of the image forming apparatus 10 is configured to acquire a term that is to be displayed on the operation/display portion 11 based on a term ID, from the term management table 41 stored in the term management server 90. For example, the acquiring processing portion 172 is configured to acquire, in a batch, a plurality of terms that are to be displayed on the operation/display portion 11 based on term IDs, from the term management table 41 stored in the term management server 90.

In the present embodiment, the acquiring processing portion 172 is configured to acquire, in a batch, a plurality of terms that are to be displayed on the operation/display portion 11 based on term IDs, from the term management table 41 stored in the term management server 90, based on a piece of term set information 50 selected from a plurality of pieces of term set information 50 stored in the term management server 90. For example, the acquiring processing portion 172 acquires, in a batch, the plurality of terms from the term management table 41, based on a piece of term set information 50 selected by the user on a term change screen 33 shown in FIG. 11, displayed on the operation/display portion 11. More specifically, for example, when "term set of model B1" is selected by the user on the term change screen 33 shown in FIG. 11, the acquiring processing portion 172 acquires, in a batch, a plurality of terms from the term management table 41, based on a piece of term set information 50 associated with the model B1.

It is noted that the acquiring processing portion 172 may acquire, in a batch, a plurality of terms of the latest term version for each term ID from the term management table 41 stored in the term management server 90. For example, when the user has selected a button B4 to select a "term set of latest terms" on the term change screen 33 shown in FIG. 11 displayed on the operation/display portion 11, the acquiring processing portion 172 acquires, in a batch, a plurality of terms of the latest term version for each term ID from the term management table 41. For example, in a case where a new term version is added in sequence and the latest term version changes in the term management table 41 shown in FIG. 9, as term version 1->term version 2->term version 3->. . . , a term having the highest term version ID for each term ID is acquired as the term of the latest term version.

Figure 12:
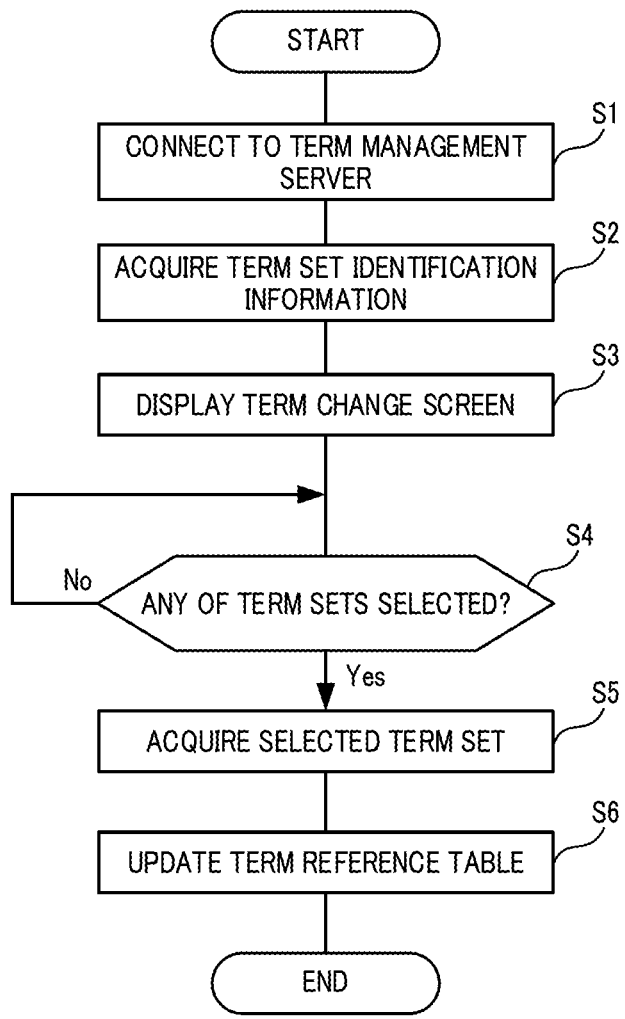
FIG. 12 is a flowchart showing an example of a procedure of a term change process executed in the image forming apparatus according to the embodiment of the present disclosure.

In the following, an example of the procedure of a term change process executed by the control portion 17 is described with reference to FIG. 12. Here, steps S1, S2, . . . represent numbers assigned to the processing procedures (steps) executed by the control portion 17. It is noted that the term change process is started in response to input of a term change instruction via the operation/display portion 11 by the user.

<Step S1>

First, in step S1, the control portion 17 is connected to the term management server 90 via the communication interface 15.

<Step S2>

In step S2, the control portion 17 acquires term set identification information from the term management server 90. The term set identification information is used to identify each piece of term set information 50 registered in the term set information management table 42 shown in FIG. 10, by, for example, a term set name such as the "term set of model A1". The term set identification information is stored in the term management server 90 in association with the term set information 50 registered in the term set information management table 42.

<Step S3>

In step S3, the control portion 17 displays, on the operation/display portion 11, the term change screen 33 shown in FIG. 11, based on the term set identification information acquired in step S2. For example, the control portion 17 displays buttons B1 to B4, wherein the buttons B1 to B3 correspond to three pieces of term set identification information acquired in step S2, and the button B4 is used to acquire, in a batch, a term of the latest term version for each term ID.

<Step S4>

In step S4, the control portion 17 determines whether or not any of the term sets has been selected by the user. For example, the control portion 17 determines whether or not any of the buttons B1 to B4 displayed on the term change screen 33 has been selected. When it is determined that any of the term sets has been selected (S4: Yes), the process moves to step S5. On the other hand, when it is determined that any of the term sets has not been selected (S4: No), the process of step S4 is repeated until it is determined that any of the term sets has been selected.

<Step S5>

In step S5, the control portion 17 acquires the term set selected by the user, from the term management server 90. More specifically, the control portion 17, based on a piece of term set information 50 associated with the term set selected by the user, acquires, in a batch, a plurality of terms indicated by the piece of term set information 50, from the term management table 41.

<Step S6>

In step S6, the control portion 17 updates the term reference table 20 stored in the storage portion 16, based on the term set acquired in step S5. As a result, the terms associated with the term IDs defined in the term reference table 20 are replaced with the term set acquired in step S5, and the terms displayed on the operation/display portion 11 are changed based on the term reference table 20 after the replacement.

It is noted that the communication with the term management server 90 in the steps S1 and S5 is executed by the control portion 17 via the communication interface 15. In addition, the process of step S5 (acquiring processing step) is executed by the acquiring processing portion 172 of the control portion 17.

As described above, according to the present embodiment, terms that can be used in the image forming apparatus 10 can be acquired from the term management server 90. As a result, it is possible to easily change the terms that are used in a plurality of image forming apparatuses 10.

In addition, according to the present embodiment, the image forming apparatus 10 is configured to acquire, in a batch, a plurality of terms from the term management server 90 based on the term set information 50. As a result, if, for example, the user would like to change the terms displayed on the model A1 or A2 to the terms displayed on the model B1, the user can change the terms only by selecting "term set of model B1".

In addition, according to the present embodiment, when, for example, a new model is released in which a term set that is different from those used in the old models is used, it is possible to easily change any term set used in an old model to the term set used in the new model, by adding the new terms used in the new model into the term management table 41, and registering a piece of term set information 50 of the new model in the term set information management table 42.

It is noted that the present embodiment describers a case where terms displayed on the image forming apparatus 10 are changed. However, by using the term management server 90, it is possible to change terms displayed on an apparatus other than the image forming apparatus 10. For example, in a computer in which a management software program for managing the image forming apparatus 10 has been installed, when the management software program has been configured to display terms on the display portion of the computer based on term IDs, it is possible to easily change the terms defined in the term reference table 20 that is referenced by the management software program. This makes it possible to easily integrate the terms displayed on the image forming apparatus 10, and the terms displayed on the computer for managing the image forming apparatus 10. This also applies to a computer in which a printer driver for giving a print instruction to the image forming apparatus 10 has been installed.

It is noted that in the present embodiment, a plurality of pieces of term set information 50 associated with a plurality of versions of models of the image forming apparatus 10 are included in the term set information management table 42. However, the present disclosure is not limited to this configuration. As another embodiment, a plurality of pieces of term set information 50 associated with a plurality of clients may be included in the term set information management table 42. For example, suppose that a client A who manages a plurality of image forming apparatuses 10 in a company, would like to integrate terms for "term 0001" into "collective printing", and terms for "term 0002" into "poster". In this case, it is possible to meet the client A's demand by registering a piece of term set information 50 associated with the client A, as shown in FIG. 13, in the term set information management table 42.

In addition, in the present embodiment, for example, the term change process is started in response to input of the term change instruction by the user via the operation/display portion 11. However, the present disclosure is not limited to this configuration. As another embodiment, for example, the image forming apparatus 10 may be provided with an automatic update function for automatically acquiring, on a regular basis, a term set associated with latest terms from the term management server 90.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A term management system comprising:
   a term management portion storing term management information in which terms are defined in association with corresponding term IDs; and
   a plurality of image forming apparatuses each including an acquiring processing portion configured to acquire one or more terms from the term management information so that the one or more terms are displayed on a display portion based on corresponding one or more term IDs, wherein
   in the term management information, each of the term IDs is associated with a plurality of terms,
   the acquiring processing portion is configured to acquire, in a batch, two or more terms from the term management information based on term set information in which one of the plurality of terms is defined for each of the term IDs so that the two or more terms are displayed on the display portion based on corresponding two or more term IDs,
   a plurality of pieces of the term set information are stored in the term management portion,
   the plurality of pieces of the term set information include one or more pieces of the term set information that respectively correspond to one or more models of each of the plurality of image forming apparatuses,
   each of the plurality of image forming apparatuses further includes a display control portion configured to display, on the display portion, a term change screen that allows a user to select a desired piece of the term set information from the plurality of pieces of the term set information stored in the term management portion, and
   the acquiring processing portion is configured to acquire, in a batch, two or more terms from the term management information based on a piece of the term set information selected on the term change screen by the user from the plurality of pieces of the term set information stored in the term management portion so that the two or more terms are displayed on the display portion based on corresponding two or more term IDs.

2. The term management system according to claim 1, wherein
   the plurality of pieces of the term set information include one or more pieces of the term set information that respectively correspond to one or more versions of each model of each of the plurality of image forming apparatuses.

3. The term management system according to claim 1, wherein
the plurality of pieces of the term set information include one or more pieces of the term set information that respectively correspond to one or more clients who manage the plurality of image forming apparatuses.

4. The term management system according to claim 1, wherein
the term change screen includes a button used to acquire, in a batch, latest terms respectively associated with the term IDs from the term management information, and
upon selection of the button, the acquiring processing portion acquires, in a batch, the latest terms respectively associated with the term IDs from the term management information.

5. The term management system according to claim 1, wherein
the acquiring processing portion is configured to acquire, in a batch, latest terms respectively associated with the term IDs from the term management information.

6. The term management system according to claim 5, wherein
the acquiring processing portion is configured to automatically acquire, in a batch on a regular basis, latest terms respectively associated with the term IDs from the term management information.

7. The term management system according to claim 1, wherein
various types of screens displayed on the display portion are generated based on screen configuration information defined in advance, the screen configuration information being defined by using the term IDs, and
each
display control portion is configured to display the various types of screens on the display portion in a state where term IDs included in the various types of screens have been replaced with corresponding terms acquired from the term management information by the acquiring processing portion.

8. The term management system according to claim 7, wherein
the various types of screens include a print setting screen or a help screen.

9. The term management system according to claim 1, further comprising:
a computer in which a management software program for managing the image forming apparatuses has been installed, wherein
the computer is configured to acquire one or more terms from the term management information so that the one or more terms are displayed on a display portion of the computer by the management software program based on corresponding one or more term IDs.

10. The term management system according to claim 1, further comprising:
a computer in which a printer driver for giving a print instruction to the image forming apparatuses has been installed, wherein
the computer is configured to acquire one or more terms from the term management information so that the one or more terms are displayed on a display portion of the computer by the printer driver based on corresponding one or more term IDs.

11. The term management system according to claim 1, wherein
the term change screen includes two or more buttons for selecting one of two or more pieces of the term set information that respectively correspond to two or more models of each of the plurality of image forming apparatuses, names of the two or more models being displayed respectively on the two or more buttons.

* * * * *